May 24, 1955

I. V. K. HOTT ET AL 2,708,988

AXLE ENGAGING DEVICE FOR VEHICLE LIFT

Filed Sept. 5, 1951

3 Sheets-Sheet 1

INVENTORS.
ION V. K. HOTT
ROBERT J. HADDIX
BY

ATTORNEY

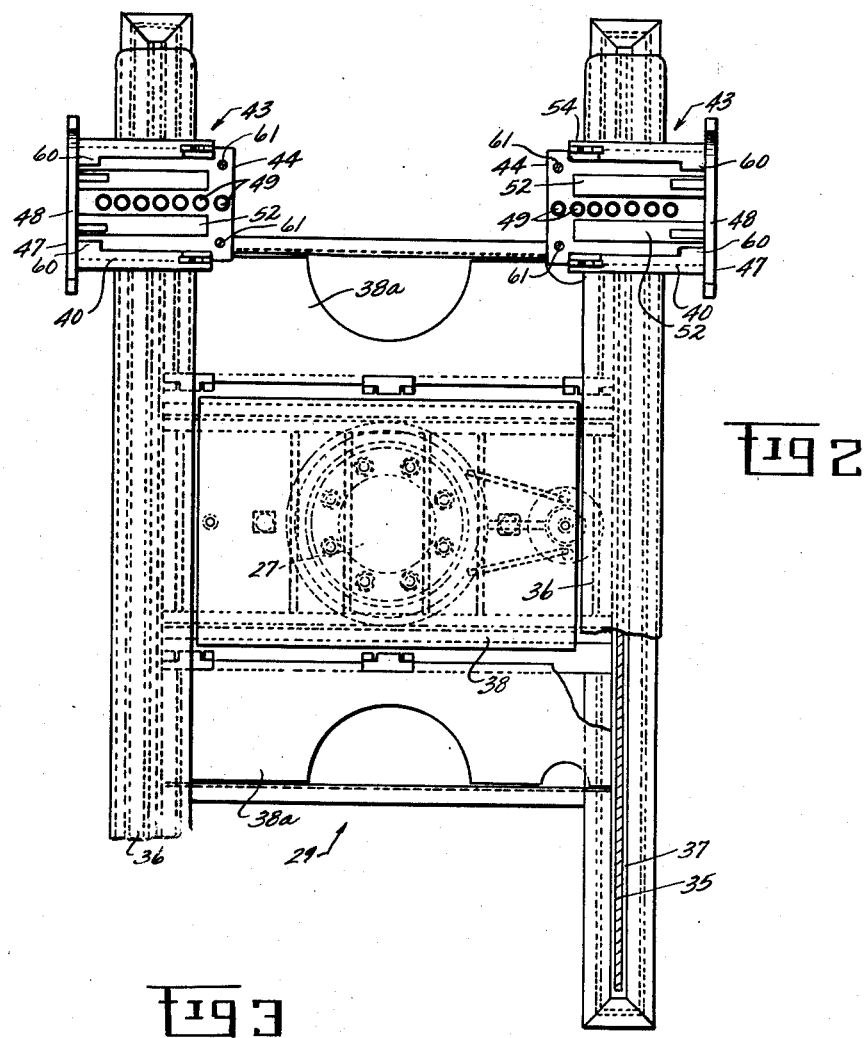
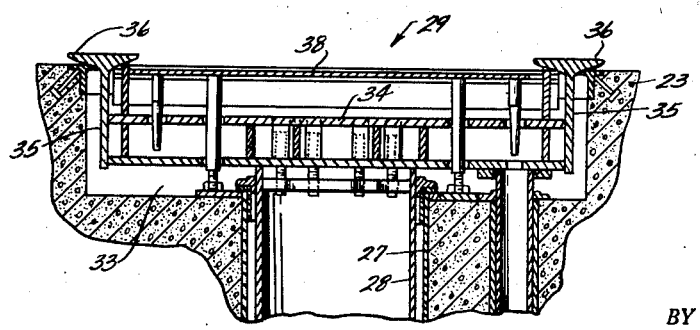

May 24, 1955     I. V. K. HOTT ET AL     2,708,988

AXLE ENGAGING DEVICE FOR VEHICLE LIFT

Filed Sept. 5, 1951     3 Sheets-Sheet 3

INVENTOR.
ION V. K. HOTT
ROBERT J. HADDIX
BY

ATTORNEY

United States Patent Office 2,708,988
Patented May 24, 1955

2,708,988

AXLE ENGAGING DEVICE FOR VEHICLE LIFT

Ion V. K. Hott and Robert J. Haddix, Dayton, Ohio, assignors to The Joyce-Cridland Company, Dayton, Ohio, a corporation of Ohio Application September 5, 1951, Serial No. 245,168

3 Claims. (Cl. 187—8.75)

This invention relates to a vehicle lift and more particularly an axle engaging device for the superstructure of such a lift. The present application is a continuation in part of our application filed September 29, 1948, Ser. No. 51,668, now Patent No. 2,681,077 granted June 15, 1954.

One object of the invention is to provide an axle engaging device which is adjustable both longitudinally of and transversely to an elongate load supporting element on which it is mounted.

A further object of the invention is to provide such a device which can be quickly and easily mounted on and removed from the load supporting element.

A further object of the invention is to provide an axle engaging device of such a character that the axle engaging member thereof can be adjusted transversely to the load supporting element from a point remote from said device.

A further object of the invention is to provide such a device which can be adjusted both longitudinally of and transversely to a load supporting element by an operator stationed adjacent one end of a vehicle supported on the superstructure.

Other objects of the invention may appear as the invention is described in detail.

Figure 4:
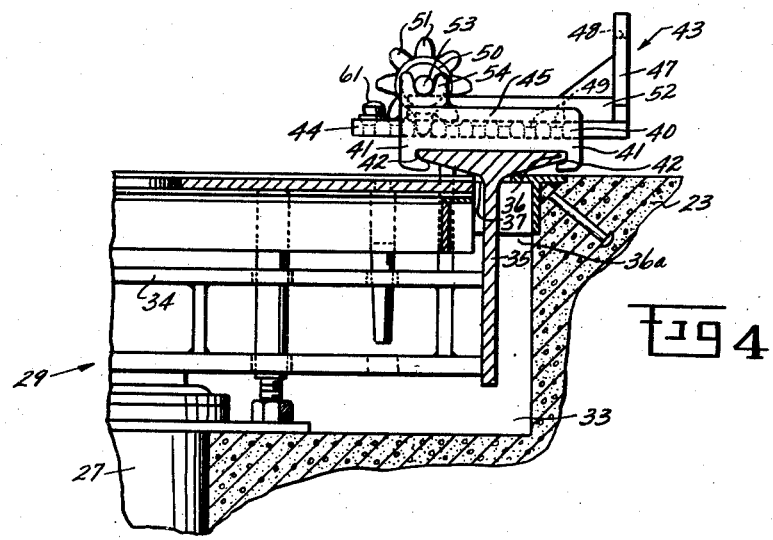
Figure 5:
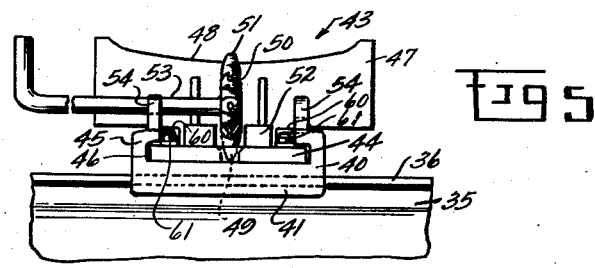
Figures 6, 7:
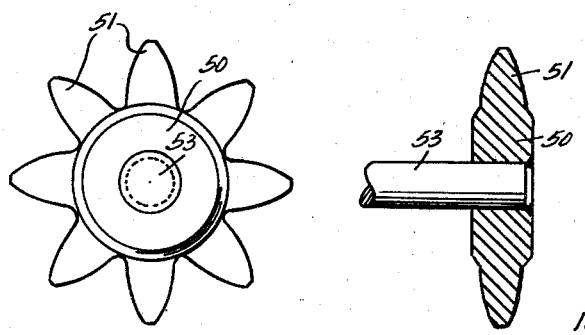

In the accompanying drawings Fig. 1 is a perspective view of a vehicle lift to which the invention is applied; Fig. 2 is a top plan view, partly broken away, of a lifting mechanism of that lift; Fig. 3 is a sectional view through a portion of said lifting mechanism, showing the load supporting elements in transverse section; Fig. 4 is a transverse section through one of the load supporting elements of the lifting mechanism showing the axle engaging device mounted thereon; Fig. 5 is a side elevation of the axle engaging device; Fig. 6 is a side elevation of the device for actuating the axle engaging member; and Fig. 7 is a section taken centrally through that device.

In these drawings we have illustrated one embodiment of the invention and have shown the same as applied to one lifting mechanism of a two-post hydraulic lift, but it is to be understood that the invention may be applied to lifting mechanisms of various kinds and that the axle engaging device as a whole, as well as the several parts thereof, may take various forms without departing from the spirit of the invention.

In Fig. 1 we have illustrated one type of vehicle lift to which the axle engaging device may be applied. This particular lift is of the type known as a two-post lift, that is it comprises two separate lifting mechanisms, 20 and 21, adapted to support the respective end portions of the vehicle. As here shown the lifting mechanism 21 comprises two cylinders 22 mounted below a floor 23 and having therein lifting elements, or pistons, 24 provided at their upper ends with wheel engaging elements 25, which are recessed to receive and position the wheels, and when the pistons are in their lowermost positions are seated in shallow recesses 26 in the floor 23. The lifting mechanism 20 comprises a single cylinder 27 having therein a lifting element, or piston, 28. On the upper end of the piston 28 a superstructure 29 is rigidly mounted. The cylinders of the two lifting mechanisms are connected with a common source of fluid under pressure 71, by conduits 30 and 31, the conduit 31 being branched as shown at 32 and connected with both of the cylinders 22. The flow of fluid from the source 71 to the cylinders may be controlled in any suitable manner, as by valve mechanism enclosed in a control box 74 and actuated by a member 95.

The upper end of the cylinder 27 of the lifting mechanism 20 terminates in the lower portion of a shallow pit 33 in the floor 23. The piston 28 is rigidly connected with the superstructure 29 which, in the present instance, comprises a transverse frame member 34 connected between its ends with the piston and having parallel load supporting elements 35 rigidly secured to the respective ends thereof. Each of said load supporting elements has on the upper portion thereof laterally extending parts 36, the load supporting elements being preferably in the nature of T-rails. The pit 33 includes narrow elongate portions 36a extending forwardly and rearwardly from both sides of the wide portion of the pit and having relatively narrow openings 37 through the floor. The thin lower portions of the load supporting elements or rails extend through the openings 37 into these narrow portions of the pit. The upper portions or heads of the rails are above the floor level and when the lift is in its lowermost position the laterally projecting portions 36 thereof are spaced slightly above the floor.

Mounted on each rail is a device to engage an axle of a vehicle, or a part rigid with the axle, above the rails and support the axle thereon. Inasmuch as different automobiles have wheel bases of different lengths and the wheels on the lifting mechanism 21 are supported in predetermined positions, the supporting devices for the axle at the other end of the vehicle are supported on the rails for adjustment lengthwise thereof to accommodate the lift to different automobiles. These axle engaging devices may take various forms and as here shown each such device comprises a base 40 supported on the rail 35 for movement lengthwise thereof. In the present arrangement the base has a flat lower surface which is slidably supported on the rail head and is provided at each side of the rail head with a downwardly extending portion 41 to prevent the lateral displacement of the base with relation to the rail head and these downwardly extending portions are provided with inwardly facing channels 42 to receive the respective edges of the rail head and thus prevent the tilting or upward movement of the base with relation to the rail head. Mounted on the base 40 for adjustment transversely to the rail is an axle engaging member 43 which in the present instance comprises a plate 44 slidably supported on the base, the base being provided at its ends with upwardly extending parts 45 having inwardly facing channels 46 to receive the respective edges of the plate 44 to prevent the lateral displacement thereof and guide the same in its movement on the base. Rigidly secured to the plate 44 is an upwardly extending part 47 which is adapted to have supporting engagement with the axle. This part may be located in any suitable position on the plate but is preferably located adjacent one end thereof and extends lengthwise of the rail and transversely to the axle. The base is reversible on the rail so that the part 47 may be located on either side of the rail. As here shown this axle engaging part 47 is of substantial length and has an intermediate portion of its upper edge depressed as shown at 48, the depressed portion being preferably slightly curved.

Any suitable means may be provided for adjusting the axle engaging device as a whole lengthwise of the rail and for adjusting the axle engaging member transversely thereto, but preferably actuating means are provided whereby these adjustments may be effected from a point remote from the axle engaging device, as by an operator at the adjacent end of an automobile above the lift. This actuating means may take various forms but in the present instance it comprises a member rotatable about an axis substantially parallel with the rail and having driving connection with the axle engaging member 43. Preferably the actuating device has a rack and pinion connection with the plate 44. As here shown the plate 44 is provided with a longitudinal series of openings 49 spaced one from the other short distances so that the space between adjacent openings constitute in effect the teeth of a rack bar. A rotatable member, or wheel, 50 is rotatably supported on the base 40 on an axis transverse to the series of openings 49 and is provided with projections or teeth 51 to enter the openings 49 successively and move the axle engaging member transversely to the rail. Bars 52 are rigidly secured to the plate 44 on opposite sides of the series of openings 49 to accurately position and guide the rotatable member 50 with relation to the openings. The rotatable member 50 may be mounted on the base and rotated in various ways. As here shown an operating handle, or rod, 53 is rigidly secured to the rotatable member at the axis thereof and is rotatably supported on the base, this rod being of such length that it may be manipulated by an operator at the end of the vehicle. When the rotatable member 50 is in operative engagement with the plate 44 it is held against axial movement with relation to the plate, so that the longitudinal movement of the rod 53 will move the axle engaging device as a whole lengthwise of the rail. Preferably the rod is mounted in a bearing 54 which is open at its upper end so that the rod or handle and the rotatable element 50 may be removed by merely lifting the handle out of the bearing 54 and likewise can be easily re-installed on the apparatus when adjustment is to be effected. To limit the movement of the engaging member 44 it is provided adjacent the inner end thereof with stops 61, such as screw heads, and the base is provided adjacent the outer ends of the channels 46 with lugs 60 in the paths of respective stops 61 as the member 44 moves outwardly. When the lift is not in use and is in its lowered position the axle engaging device is usually removed from the rail, by moving it beyond the end of the rail, to avoid objectionable projections above the floor. When the lift is to be used the axle engaging device is slipped onto the rail, the rod is placed in the proper open bearing 54 with the toothed wheel in operative engagement with the plate 44, and the rod manipulated to move the device as a whole to a position beneath the axle of the vehicle and then rotated to move the axle engaging member transversely to the rail to the desired position with relation to the axle. In the present instance the base is provided with two open bearings 54 on opposite sides of the series of openings, so that the operating rod or handle may extend either forwardly or rearwardly from the axle engaging device.

While we have shown and described one embodiment of our invention we wish it to be understood that we do not wish to be limited to the details thereof as various modifications may occur to a person skilled in the art.

Having now fully described our invention, what we claim as new and desire to secure by Letters Patent is:

1. A pair of axle engaging devices for a lift having a pair of longitudinally extending substantially T-shaped rails with the flanges of each of the T-shaped rails being directed outwardly and the stem downwardly so that the top of the T-shaped rail lies in a substantially horizontal plane, each of said devices including a base member having laterally and downwardly disposed flange portions terminating in reentrant flanges forming channels in which the flanges of one of the T-shaped rails is mounted, said base having a pair of transversely disposed upwardly directed flanges terminating in reentrant flanges forming a pair of oppositely disposed parallel channels, a transversely disposed plate slidably mounted in the channels, an axle engaging member fixedly secured to one end of the plate and extending upwardly from the plate, said plate having a plurality of equally spaced apertures extending in a direction transverse to the longitudinal axis of the T-shaped rail, said apertures cooperating to form a ratchet-like structure, a pair of bars extending parallel to the apertures and fixedly attached to the top of the plate for guiding and reinforcing the plate, said bars extending parallel and in close proximity to the reentrant flanges of the upwardly directed flanges of the base, a toothed wheel meshing with the apertures in the plate, and means for mounting the toothed wheel for rotation so that upon the toothed wheel being rotated the plate is moved transversely with respect to the longitudinal axis of the underlying T-shaped rail.

2. A pair of axle engaging devices for a lift having a pair of longitudinally extending substantially T-shaped rails with the flanges of each of the T-shaped rails being directed outwardly and the stem downwardly so that the top of the T-shaped rail lies in a substantially horizontal plane, each of said devices including a base member having laterally and downwardly disposed flange portions terminating in reentrant flanges forming channels in which the flanges of one of the T-shaped rails is mounted, said base having a pair of transversely disposed upwardly directed flanges terminating in reentrant flanges forming a pair of oppositely disposed parallel channels, a transversely disposed plate slidably mounted in the channels, an axle engaging member fixedly secured to one end of the plate and extending upwardly from the plate, said plate having a plurality of equally spaced apertures extending in a direction transverse to the longitudinal axis of the T-shaped rail, said apertures cooperating to form a ratchet-like structure, a toothed wheel meshing with the apertures in the plate, and means for mounting the toothed wheel for rotation so that upon the toothed wheel being rotated the plate is moved transversely with respect to the longitudinal axis of the underlying T-shaped rail.

3. A pair of axle engaging devices for a lift having a pair of longitudinally extending substantially T-shaped rails with the flanges of each of the T-shaped rails being directed outwardly and the stem downwardly so that the top of the T-shaped rail lies in a substantially horizontal plane, each of said devices including a base member having laterally and downwardly disposed flange portions terminating in reentrant flanges forming channels in which the flanges of one of the T-shaped rails is mounted, said base having a pair of transversely disposed upwardly directed flanges terminating in reentrant flanges forming a pair of oppositely disposed parallel channels, a transversely disposed plate slidably mounted in the channels, means mounted upon the plate for engaging the axle, said plate having a plurality of equally spaced apertures extending in a direction transverse to the longitudinal axis of the T-shaped rail, said apertures cooperating to form a ratchet-like structure, a pair of bars extending parallel to the apertures and fixedly attached to the top of the plate for guiding and reinforcing the plate, said bars extending parallel and in close proximity to the reentrant flanges of the upwardly directed flanges of the base, a toothed wheel meshing with the apertures in the plate, and means for mounting the toothed wheel for rotation so that upon the toothed wheel being rotated the plate is moved transversely with respect to the longitudinal axis of the underlying T-shaped rail.

References Cited in the file of this patent

UNITED STATES PATENTS

| | | |
|---|---|---|
| 2,045,173 | Baird | June 23, 1936 |
| 2,592,845 | Aron | Apr. 15, 1952 |